United States Patent
Bertocci

[11] Patent Number: 5,933,774
[45] Date of Patent: Aug. 3, 1999

[54] LOCATION REGISTERING APPARATUS FOR USE WITH A CELLULAR TELEPHONE MOBILE STATION

[75] Inventor: Guido Bertocci, Freehold, N.J.

[73] Assignee: Lucent Technologies Inc., Murray Hill, N.J.

[21] Appl. No.: 08/741,998

[22] Filed: Oct. 31, 1996

[51] Int. Cl.⁶ .............................. H04Q 7/38; H04M 11/00
[52] U.S. Cl. .......................... 455/417; 455/426; 455/445; 455/575
[58] Field of Search .................................... 455/417, 426, 455/445, 560, 573, 575, 90

[56] References Cited

U.S. PATENT DOCUMENTS

| | | | |
|---|---|---|---|
| 5,197,092 | 3/1993 | Bamburak | 455/417 |
| 5,222,123 | 6/1993 | Brown et al. | 455/417 |
| 5,504,804 | 4/1996 | Widmark et al. | 455/445 |
| 5,506,888 | 4/1996 | Hayes et al. | 455/445 |

*Primary Examiner*—Willis R. Wolfe
*Attorney, Agent, or Firm*—Samuel R. Williamson; Jeffrey J. Brosemer

[57] ABSTRACT

A location registering apparatus provides for redirecting of telephone calls intended for a mobile station to, for example, a land-line subscriber telephone number through the use of a station registering device and a suitably configured cellular recharger for charging a battery located in the mobile station. In operation, when a user places the mobile station in the cellular recharger, a signal from the cellular recharger and reflective of this action is provided to the station registering device. Upon receiving this signal, the station registering device initiates a call to a location register in the telephone network and reconfigures information for the mobile station in this network so that all calls intended for this mobile station are rerouted to the previously provided subscriber telephone number, for example, the station user's home or office number. When the mobile station is removed from the cellular recharger, the registering device initiates a telephone call to the telephone cellular network and reconfigures the information for the mobile station so that all calls for the mobile station are once again routed to and received directly by the mobile station.

15 Claims, 3 Drawing Sheets

LOCATION REGISTERING APPARATUS FOR USE WITH A CELLULAR TELEPHONE MOBILE STATION

BACKGROUND OF THE INVENTION

1. Technical Field

This invention relates generally to wireless radio telephones and, more particularly, to radio telephones operative with a station registering device for redirecting of telephone calls.

2. Description of the Prior Art

Modern mobile stations employ a range of communication techniques, including frequency, time and/or code division multiplexed narrowband radio frequency, for establishing and maintaining telecommunications with cellular base stations. With the growing popularity of mobile stations configured for operating in cellular telephone systems, increased flexibility in user utilization of these mobile stations is desired. One approach to providing user flexibility of the mobile stations is by providing low-power personal or private base stations over which a user can register his or her mobile station and also make and receive telephone calls. A private base station shares the same frequency bands with large cellular base stations, but operates at a greatly reduced power level. Also, each private base station has a land-line subscriber telephone number through which all incoming and outgoing calls are routed. An arrangement that employs a private base station is described in co-pending U.S. patent application Ser. No. 08/509,406.

Although private base stations currently exist that can support registration of a mobile station, these stations require a number of complex procedures for operation in a cellular telephone system. For example, before a private base station can begin initial operation, it must scan the cellular radio frequencies to determine those frequencies that are in use by cellular base stations within its operating range. This procedure is to ensure that the private base station does not operate on a frequency that would potentially interfere with any near-by cellular base stations. Thus, because of their complexity, private base stations are currently expensive. It is desirable, therefore, to be able to economically reroute or forward cellular telephone calls intended for a mobile station to, for example, the station user's home telephone number when that user is at home and does not require cellular telephone service.

SUMMARY OF THE INVENTION

In accordance with the present invention, redirecting of telephone calls intended for a mobile station to a land line subscriber telephone number is easily achieved through the use of a station registering device which receives input from a suitably configured cellular recharger for charging a battery located in the mobile station. In accordance with an aspect of the invention, when a user places the mobile station in the cellular recharger, a signal from the cellular recharger and reflective of this action is provided to the station registering device. Upon receiving this signal, the station registering device initiates a telephone call to the telephone cellular network and reconfigures information for the mobile station in this network in a manner so that all calls intended for this station are rerouted to a land-line subscriber telephone number, for example, the station user's home or office number. When the mobile station is removed from the cellular recharger, the registering device makes a telephone call to the telephone cellular network and reconfigures the information for the mobile station so that all calls for the mobile station are once again routed to and received directly by the mobile station.

BRIEF DESCRIPTION OF THE DRAWING

This invention and its mode of operation will be more clearly understood from the following detailed description when read with the appended drawing in which.

Throughout the drawings, the same element when shown in more than one figure is designated by the same reference numeral.

DETAILED DESCRIPTION

Figure 1:
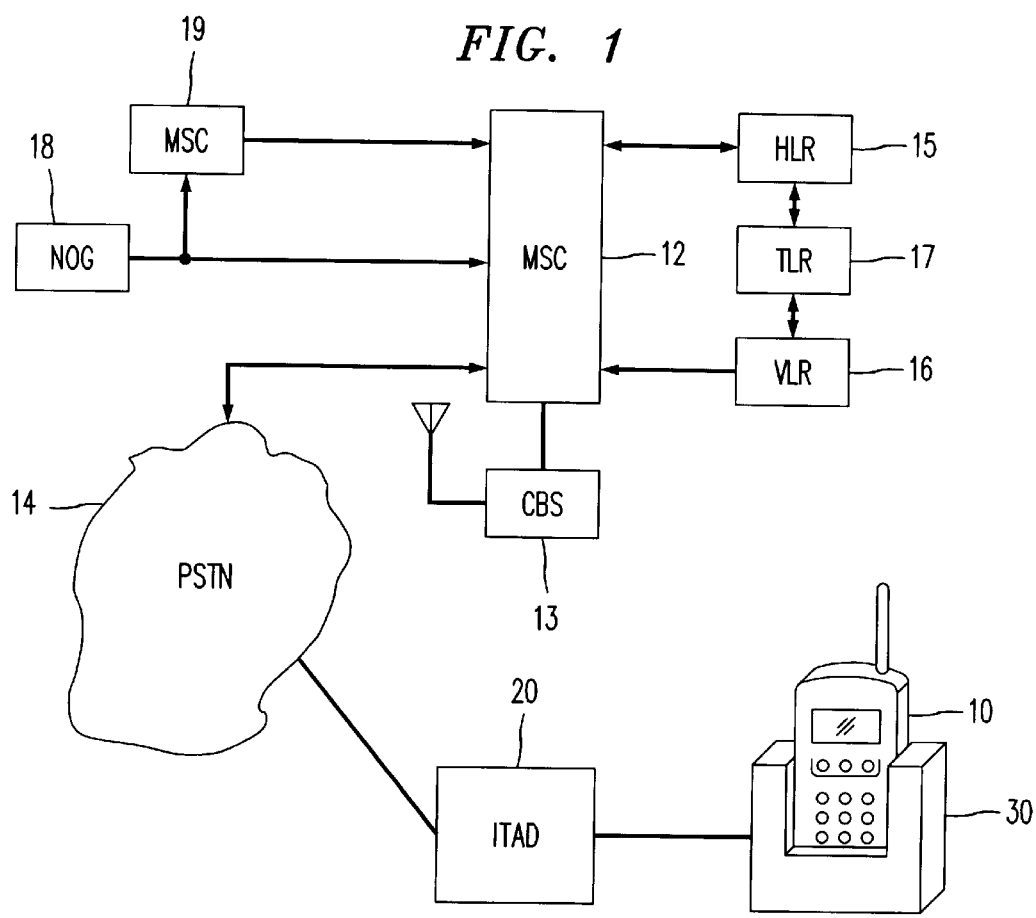
FIG. 1 shows a simplified block diagram of a cellular switching system, its logical entities as well as the relative connection with the public switched telephone network and a station registering device, in accordance with the invention.

Referring now to FIG. 1, there is shown a simplified block diagram of a cellular switching system, its logical entities as well as the relative connection with the public switched telephone network and an integrated telephone answering device which is configured for and performs a station registering function. The cellular concept is well known and is described in general in the *Bell System Technical Journal*, Volume 58, Number 1, January 1979, and specifically in an article entitled *The Cellular Concept* by V. H. MacDonald, on pages 15 through 41 of this journal.

Included within the cellular switching system are mobile station (MS) 10, mobile switching center (MSC) 12, a cellular base station (CBS) 13, the public telephone switched network (PSTN) 14, a home location register (HLR) 15, a visiting location register (VLR) 16 and a mobile station or terminal location register (TLR) 17. A private base station visiting location register easily provides the features and functions for accommodating a device performing a station registering function. Also shown in FIG. 1, but not necessarily as a part of the cellular system, are the integrated telephone answering device ITAD 20 which, along with a cellular recharger 30, is configured for providing the station registering function as described in detail later herein.

For clarity, mobile switching center 12 is illustratively shown connected to mobile switching center 19 and network operation controller (NOC) 18. The mobile switching center 19 is part of the overall cellular systems operation and may similarly have a home location register, a visiting location register, a terminal location register, as well as multiple cellular base stations associated therewith. It is understood that other mobile switching centers also may be part of the cellular system. The network operation controller 18 provides overall control and thereby ensures that the operation of the whole cellular system is supported and serviced.

The mobile station 10 is designed to operate in a cellular system in accordance with the Telecommunications Industry Association (TIA) Interim Standard (IS)-136, dated December 1994.

The mobile switching center 12 performs all the switching functions related to call delivery and is interconnected to the public telephone switched network 14, the home location register 15, the visiting location register 16 and the cellular base station 13.

The home location register 15 maintains a data base, profile record and call routing information or a pointer to the call routing information for all mobile stations in a particular assigned home area. The visiting location register 16 maintains a data base for call routing information or a pointer to the call routing information for those mobile stations which are visiting outside of their respectively assigned areas of coverage.

The terminal location register 17 performs the interface functions between a location registering device, such as provided in ITAD 20, and both the home location register 15 and the visiting location register 16 for holding call routing information for the mobile station 10.

The functions for the terminal location register 17 may be conveniently summarized as follows:

1. Authorize new registration operation.
2. Download location registration operating parameters and perform operation administration.
3. Authenticate all calls received from station registering device.
4. Perform registration notification task to HLR/VLR when network update is received from station registering device.
5. Perform mobile station inactive task to HLR/VLR when network cancellation is received from station registering device.

The station registering function provided by both ITAD 20 and recharger 30 is suitable for private (or non-public) mode time-division-multiple-access (TDMA) cellular operation under the IS-136 cellular radio interface. This radio interface describes and supports a modem interface between the station registering function in the ITAD 20 and the terminal location register 17. This interface also permits a cellular mobile station to receive or originate calls through a land-line connected to the public telephone switched network instead of through a cellular base station.

When the user places the mobile station 10 in the cellular recharger 30, the ITAD 20 makes a modem connection to the terminal location register 17 to update the mobile station's temporary line dialing number (TLDN). In providing this communications, any number of well known protocols that exist in the industry today may be used. By way of example, modem protocols such as V.22, V.22bis or Bell 212 are all suitable for communications between the ITAD 20 and the terminal location register 17. It is also possible to have a packet data protocol provide the two-way communications requirement. For example, an X.25 packet data protocol may be used in providing this communications. The temporary line dialing number will be the ITAD's land-line number (LLN) or alternatively, it can be any number at which the mobile station user wishes to reroute his or her calls. The user is able to enter a desired temporary line dialing number, for subsequent use during a location registering operation, by entering such number through use of buttons 29 and a display 28 that connect to a microcontroller 23 in the ITAD 20. Hence, when an incoming call is directed to the mobile station 10, information for this station is accessed from the terminal locating register 17 through the home location register 15 or the visiting location register 16 and the call routed to the ITAD's LLN. It is also understood that the temporary line dialing number may be stored in either the home location register 15 or the visiting location register 16, and the mobile switching center 12 then accesses this TLDN from the appropriate one of these registers. The ITAD 20 thus receives calls intended for the mobile station 10 and directs these calls to telephones attached to the temporary land dialing number.

Figure 2:
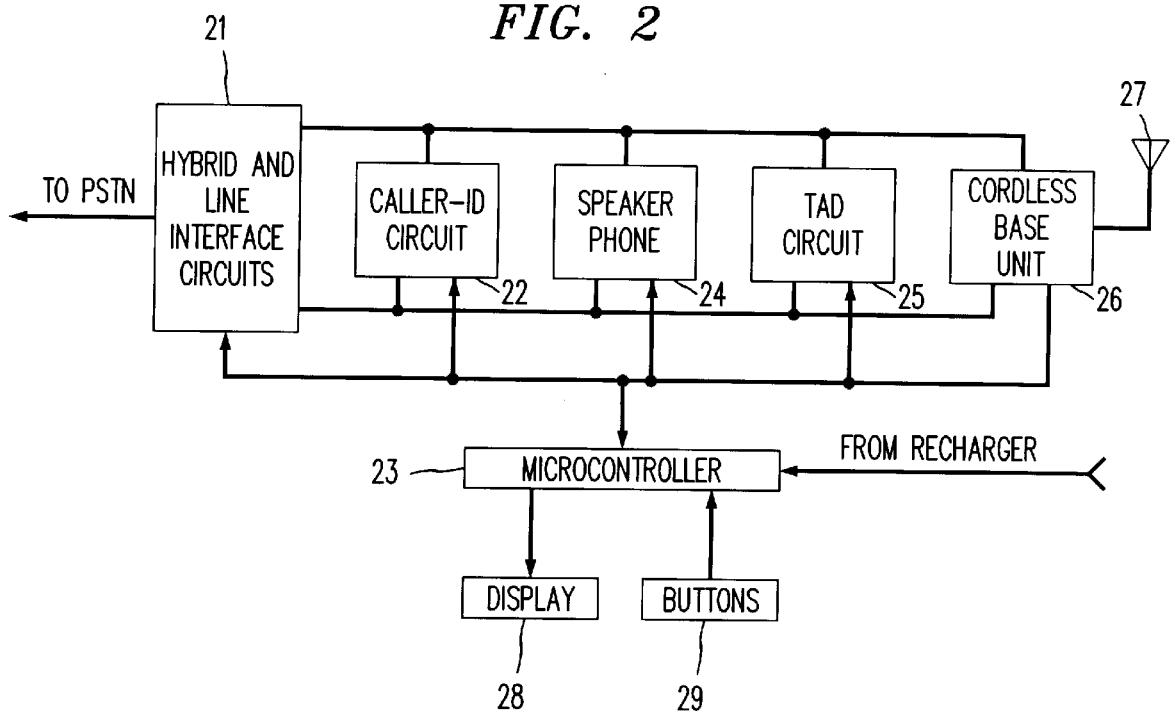
FIG. 2 shows a high level block diagram of an integrated telephone answering device which is separated into identifiable circuit sections and is suitably arranged for providing the station registering function.

Shown in FIG. 2 is a high-level block diagram of ITAD 20 separated into identifiable circuit sections. Connected to the PSTN 14 is a hybrid and line interface circuits interface section 21 which performs the required functions for interfacing the ITAD 20 to the public switched telephone network 14 for executing the station registering function. Also included in interface section 21 are such functions and circuits as, for example, switch-hook and modem operations, hybrid, ring detect, line termination, on/off hook signal interface signals and the like.

In addition to the station registering functions, the ITAD 20 advantageously combines other normally stand-alone devices into this one unit. A caller-ID circuit 22 along with the microcontroller 23 perform a caller-ID function such as described in U.S. Pat. No. 5,377,261 as part of an alerting process available to the user of the ITAD 20. In providing this function, a name and the receivable caller-ID telephone number, including the area code, are conveniently stored into memory (not shown) in the microcontroller 23 for display by a user.

Speakerphone 24 and telephone answering device (TAD) circuit 25 are advantageously included in the ITAD 20 for providing additional functions and features for this unit. The TAD circuit answers calls, records messages when a user cannot or does not want to answer the telephone and notes the time and day of each message. The TAD circuitry also is capable of recording memos and telephone conversations and permits a user to retrieve messages when the user is away from home. Circuitry suitable for use in speakerphone 24 is commercially available from Lucent Technologies Inc. as either speakerphone Model S201 or speakerphone Model 870. This speakerphone circuitry is also suitably described in U.S. Pat. Nos. 4,887,288; 4,901,346 and 4,959,887.

TAD circuitry has previously been incorporated into ITADs. Two such examples are respectively described in U.S. Pat. Nos. 4,677,655 and 4,881,259. Also a telephone cordless answering system Model 5635, commercially available from Lucent Technologies Inc. incorporates circuitry suitable for use in ITAD 20 as TAD circuit 25. Additional circuitry suitable for use in TAD circuit 25 is commercially available from Lucent Technologies Inc. in digital answering systems, Models 1343, 1545, 1710, 1756 and 1830, for example. A cordless telephone base unit 26 transmits and receives signals from an associated handset unit (not shown) over antenna 27. Cordless telephones, including cordless telephone base units are described in U.S. Pat. Nos. 4,736, 404 and 4,731,814. A conventional power supply (also not shown) provides operating power for all of the circuitry in the ITAD 20.

The microcontroller 23 performs the call processing functions between the ITAD 20 and the cellular recharger 30 as well as all other control functions that are required for operation of the ITAD 20. Display 28 provides visual feedback to a user who makes entries at the ITAD 20 and also displays the received caller-ID information. Buttons 29 connect to the microcontroller 23 and are used in making entries in the ITAD 20.

Figure 3:
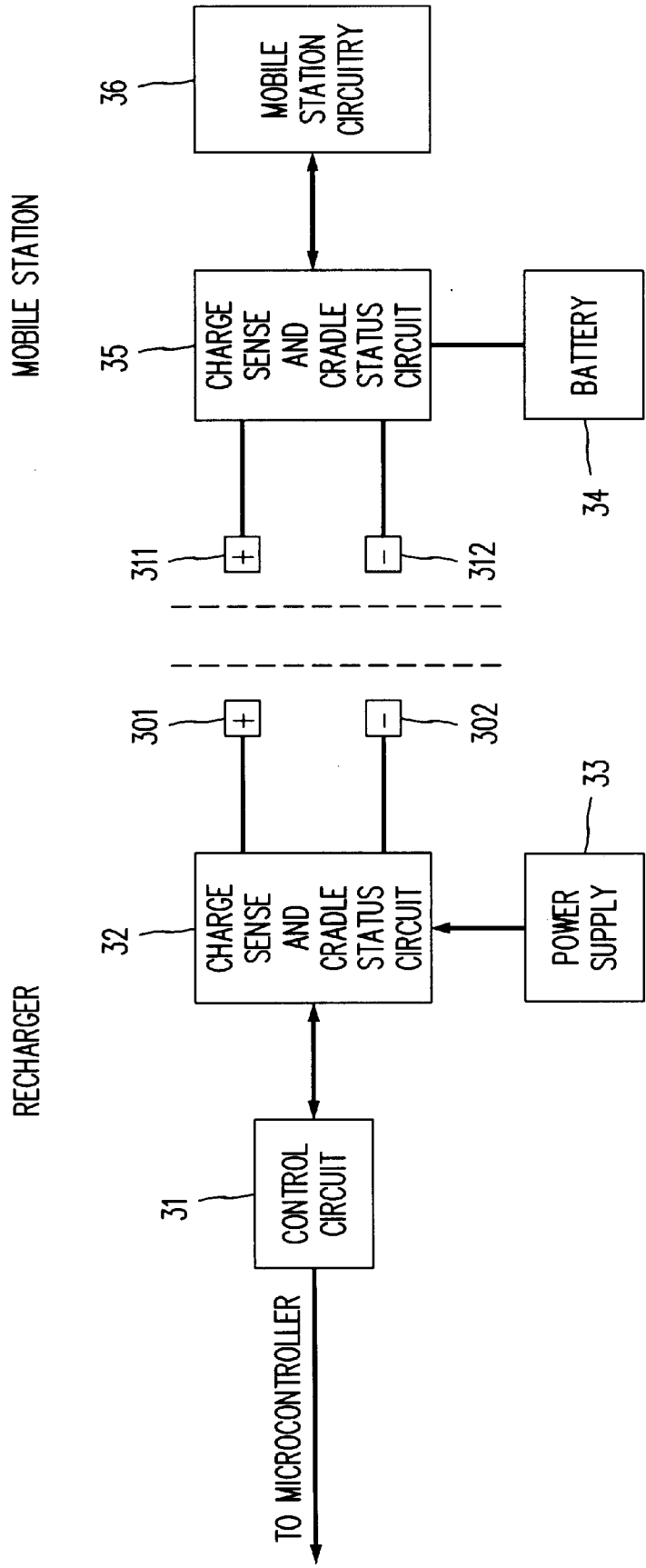
FIG. 3 shows a high level block diagram of a cellular recharger and selected components in the mobile station, in accordance with the invention.

Referring now to FIG. 3 of the drawing, there is shown in accordance with the disclosed embodiment a general block diagram of circuitry in a cellular recharger 30 suitably configured for use with the mobile station 10. The cellular recharger 30 provides a source of energy for charging a battery in the mobile station 10 when the mobile station is placed in a charging cradle in this recharger. The cellular recharger 30 provides the additional advantageous operation of providing a first signal to the microcontroller 23, shown in FIG. 2, whenever the mobile station is present in the cradle of the recharger and a second signal to the microcontroller 23 whenever the mobile station is not in the cradle of this recharger. This permits redirecting of telephone calls intended for the mobile station 10 to be forwarded to a land line subscriber telephone number.

When a user places the mobile station 10 in the cellular recharger 30, the first signal reflective of this action is generated in control circuit 31 and provided to the microcontroller 23. And when the mobile station is removed from the cradle in the cellular recharger, the second signal indicative of such removal is provided to the microcontroller 23. Information for these first and second signals for the control unit 31 are obtained from a charge sense, and cradle status circuit 32. This circuit has two functions: it provides a charging path for charging and monitoring a charge on a battery 34 in the mobile station 10 through a charge contact interface comprising contacts 301, 302, 311 and 312 from a power circuit 33; and it monitors the cradle status of the mobile station 10.

Contained in the mobile station 10 is a charge sense and cradle status circuit 35 which is similar in function to the circuit 32 in the cellular recharger 30. This circuit also has two functions: it monitors the cradle status of the mobile station 10; and it also provides a charging path for the power circuit 33 to charge the battery 34 via the charge contact interface. Circuitry suitable for use in the recharger 30, the mobile station 10, and the charge contact interface between these units is described in U.S. Pat. No. 4,736,404.

Figure 4:
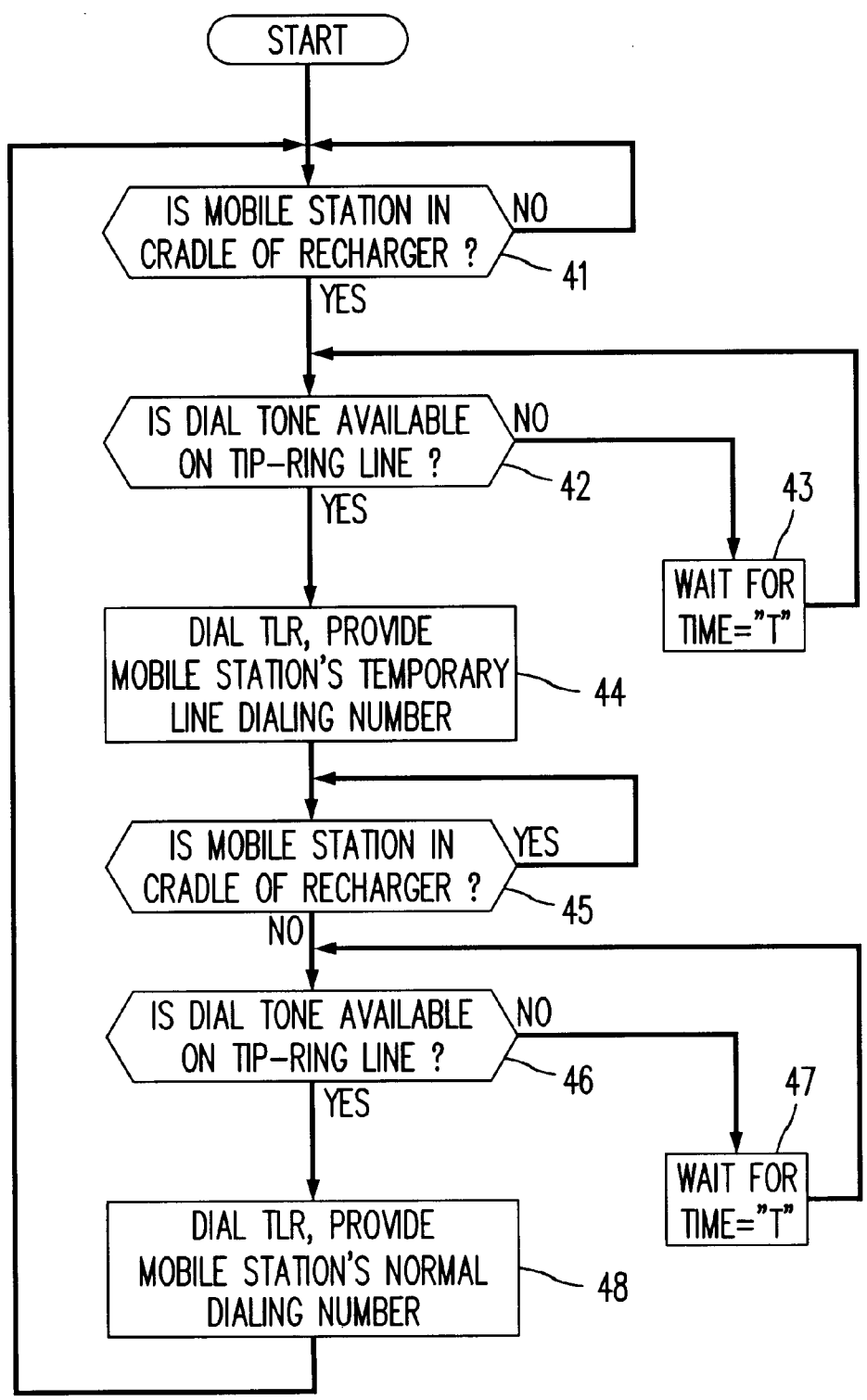
FIG. 4 shows a flow chart for illustrating the operation of the station registering device with the desired functionality in the execution of the redirecting of telephone calls intended for a mobile station to a land-line subscriber telephone number, in accordance with the invention.

Referring next to FIG. 4, there is shown a flow chart for illustrating the operation of the ITAD 20 for executing the desired function of the station registering procedure. The functions in this flow chart are advantageously provided by a process or program stored in read-only-memory (ROM) contained in the microcontroller 23.

The process is entered in decision 41 where the cellular recharger 30 monitors the status of this unit for determining whenever the mobile station has been placed in the cradle of this unit. If the mobile station 10 has not been placed in the cradle, the process remains at this decision. If, however, the mobile station 10 has been placed in the cradle, the process advances to decision 42. At this decision, the process, executed in microcontroller 23, monitors the subscriber's tip-ring or telephone land line briefly to determine if dial tone is available thereon. If dial tone is not available, the process determines that the line is busy, advances to step 43, and waits for a time period "T" where T may be typically 10 minutes. It is understood that T could easily be made less or greater than this time period. If dial tone is present on the subscriber's land line at decision 42, then the microcontroller establishes a modem connection with the TLR 17, as shown in step 44 and provides the mobile station's temporary line dialing number to the TLR 17.

From step 44, the process advances to decision 45 where it continually monitors the status of the recharger 30 for determining when the mobile station is removed from this recharger. As long as the mobile station remains in the recharger, the process resides at this decision. When the mobile station is removed from the recharger, the process advances to decision 46. At this decision, the process monitors the subscriber's telephone land line briefly to determine if dial tone is available thereon. If dial tone is not available, the process determines that the line is busy, advances to step 47 and waits for a time period "T". If dial tone is available on the subscriber's land line, then the microcontroller establishes a modem connection with the TLR 17, as shown in step 48 and provides the mobile station's normal dialing number to the TLR 17. From step 48, the process returns to decision 41 and each of the above described decisions and steps are again executed.

What has been described is merely illustrative of the present invention. Other applications to wireless telephones, computer or other communication systems other than the disclosed system are contemplated as being within the knowledge of one skilled in the art and may be utilized without departing from the spirit and scope of the present invention.

I claim:

1. A location registering apparatus comprising:

a cradling device for positioning a mobile station therein;

said cradling device including means for sensing when said mobile station is positioned in said cradling device;

said sensing means including a cradle status circuit for determining when the mobile station is present in the cradling device and a charge contact interface through which a battery in the mobile station is charged by a power source in the cradling device;

a location register for redirecting telephone calls from a first telephone number to a second telephone number;

means for providing signals to said location register, said signals being indicative either of the presence or absence of said mobile station is said cradling device;

said location register redirecting telephone calls intended for said mobile station to a land-line subscriber telephone number in response to receipt of a first signal indicating the presence of said mobile station in said cradling device; and said location register subsequently redirecting telephone calls intended for said mobile station to a telephone number associated with said mobile station in response to receipt of a second signal indicating the absence of said mobile station from said cradling device.

2. A method of registering a temporary dialing number for a mobile station comprising the steps of:

providing signals to a location register, said signals being indicative of either the presence or absence of said mobile station in the cradling device; said signals providing step including the steps of:

sensing when the mobile station is positioned in the cradling device, providing a cradling status circuit for determining when the mobile station is present in the cradling device, and providing a charge contact interface through which a battery in the mobile station is charged by a power source in the cradling device;

redirecting in the location register telephone calls intended for said mobile station to a temporary telephone number in response to receipt of a first signal indicating the presence of said mobile station in said cradling device; and redirecting in the location register telephone calls intended for said mobile station to a telephone number associated with said mobile station in response to receipt of a second signal indicating the absence of said mobile station from said cradling device.

3. A location registering apparatus comprising:

a cradling device for positioning a mobile station therein;

a location register for redirecting telephone calls from a first telephone number to a second telephone number;

means for providing signals to said location register, said signals being indicative of either the presence or absence of said mobile station from said cradling device;

said location register redirecting telephone calls intended for said mobile station to a temporary telephone number in response to receipt of a first signal indicating the presence of said mobile station in said cradling device; and said location register redirecting telephone calls intended for said mobile station to an assigned telephone number normally associated with said mobile station in response to receipt of a second signal indicating the absence of said mobile station from the cradling device.

4. The location registering apparatus of claim 3 wherein said signaling means includes a station registering device for receiving said first and second signals from said cradling device and forwarding said signals over a telephone land-line to said location register.

5. A location registering apparatus comprising:

a cradling device for positioning a mobile station therein;

a location register for redirecting telephone calls from a first telephone number to a second telephone number;

means for providing signals to said location register, said signals being indicative either of the presence or absence of said mobile station in said cradling device;

said location register redirecting telephone calls intended for said mobile station to a land-line subscriber telephone number in response to receipt of a first signal indicating the presence of said mobile station in said cradling device; and said location register redirecting telephone calls intended for said mobile station to a telephone number associated with said mobile station in response to receipt of a second signal indicating the absence of said mobile station from said cradling device.

6. The location registering apparatus of claim 1 wherein said signaling means includes a station registering device for receiving said first and second signals from said cradling device and forwarding said signals over a telephone land-line to said location register.

7. The location registering apparatus of claim 6 further including caller ID circuitry, speakerphone circuitry, telephone answering device circuitry, and cordless telephone circuitry for receiving and processing telephone calls received over said telephone land-line.

8. The location registering apparatus of claim 1 wherein said location register is a terminal location register.

9. The location registering apparatus of claim 1 wherein said location register is a visiting location register.

10. The location registering apparatus of claim 1 wherein said location register is a home location register.

11. A method of registering a temporary dialing number for a mobile station comprising the steps of:

providing signals to a location register, said signals being indicative of either the presence or absence of said mobile station in a cradling device;

redirecting in the location register telephone calls intended for said mobile station to a temporary telephone number in response to receipt of a first signal indicating the presence of said mobile station in said cradling device; and redirecting in the location register telephone calls intended for said mobile station to a telephone number associated with said mobile station in response to receipt of a second signal indicating the absence of said mobile station from said cradling device.

12. The method of claim 11 wherein said signal providing step further includes the step of providing a station registering device for receiving said first and second signals from said cradling device and forwarding said signals over a telephone land-line to said location register.

13. The method of claim 11 wherein said location register is a terminal location register.

14. The method of claim 11 wherein said location register is a visiting location register.

15. The method of claim 11 wherein said location register is a home location register.

* * * * *